(12) United States Patent
Nemtsov et al.

(10) Patent No.: US 12,095,806 B1
(45) Date of Patent: Sep. 17, 2024

(54) CYBERSECURITY VULNERABILITY VALIDATION TECHNIQUES UTILIZING RUNTIME DATA, STATIC ANALYSIS AND DYNAMIC INSPECTION

(71) Applicant: Wiz, Inc., New York, NY (US)

(72) Inventors: Arik Nemtsov, Kfar Saba (IL); Shai Keren, Tel Aviv (IL); Udi Reitblat, Tel Aviv (IL); Gal De Leon, Tel Aviv (IL); Yonatan Doron, Herzeliya (IL); Eliad Peller, Gimzo (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/392,906

(22) Filed: Dec. 21, 2023

(51) Int. Cl.
*H04L 9/40* (2022.01)

(52) U.S. Cl.
CPC ...... *H04L 63/1441* (2013.01); *H04L 63/1416* (2013.01); *H04L 63/1425* (2013.01)

(58) Field of Classification Search
CPC ............. H04L 63/1441; H04L 63/1416; H04L 63/1425; H04L 63/1433; H04L 63/1408; H04L 63/14; H04L 63/20; G06F 21/577; H04W 4/38
See application file for complete search history.

(56) References Cited

U.S. PATENT DOCUMENTS

| | | | |
|---|---|---|---|
| 9,582,662 B1 | 2/2017 | Messick et al. | |
| 10,171,300 B2 * | 1/2019 | Eggen | ................. H04L 41/0896 |
| 10,540,499 B2 | 1/2020 | Wailly et al. | |
| 10,924,347 B1 * | 2/2021 | Narsian | ................... H04L 47/12 |
| 11,005,860 B1 | 5/2021 | Glyer et al. | |
| 11,245,730 B2 | 2/2022 | Bailey | |
| 11,496,498 B2 | 11/2022 | Wright et al. | |
| 11,507,672 B1 | 11/2022 | Pagnozzi et al. | |
| 11,546,360 B2 | 1/2023 | Woodford et al. | |
| 11,570,090 B2 | 1/2023 | Shen et al. | |
| 11,645,390 B2 | 5/2023 | Vijayvargiya et al. | |
| 2013/0124669 A1 | 5/2013 | Anderson et al. | |
| 2016/0048556 A1 * | 2/2016 | Kelly | ..................... G06Q 10/10 707/767 |

(Continued)

FOREIGN PATENT DOCUMENTS

EP 4160983 A1 4/2023

OTHER PUBLICATIONS

Marchetto et al., "A Formal Approach to Verify Connectivity and Optimize VNF Placement in Industrial Networks," IEEE Transactions on Industrial Informatics Year: 2021 | vol. 17, Issue: 2 | Journal Article | Publisher: IEEE.*

(Continued)

*Primary Examiner* — Roderick Tolentino
(74) *Attorney, Agent, or Firm* — M&B IP Analysts, LLC

(57) ABSTRACT

A system and method for validating cybersecurity issues utilizing runtime data is disclosed. In an embodiment the method includes: inspecting a workload deployed in a computing environment for a cybersecurity issue; deploying a sensor on the workload, the sensor configured to collect runtime data from the workload; initiating a first mitigation action with a first priority in the computing environment in response to validating the cybersecurity issue from the collected runtime data; initiating a second mitigation action with a second priority, which is lower than the first priority, in response to failing to validate the cybersecurity issue from the collected runtime data.

11 Claims, 8 Drawing Sheets

(56) References Cited

U.S. PATENT DOCUMENTS

| | | | |
|---|---|---|---|
| 2016/0140352 A1* | 5/2016 | Nickolov | H04W 12/02 |
| | | | 726/26 |
| 2016/0373944 A1* | 12/2016 | Jain | H04M 3/2236 |
| 2018/0063290 A1 | 3/2018 | Yang et al. | |
| 2018/0343316 A1* | 11/2018 | Meyer | H04L 67/562 |
| 2019/0207966 A1 | 7/2019 | Vashisht et al. | |
| 2020/0320845 A1 | 10/2020 | Livny et al. | |
| 2020/0322227 A1* | 10/2020 | Janakiraman | H04L 41/147 |
| 2020/0382539 A1* | 12/2020 | Janakiraman | H04W 12/02 |
| 2021/0392153 A1* | 12/2021 | Bubshait | H04L 63/1416 |
| 2022/0086173 A1 | 3/2022 | Yavo et al. | |
| 2022/0215101 A1 | 7/2022 | Rioux et al. | |
| 2023/0136839 A1* | 5/2023 | Sundararajan | G06N 20/00 |
| | | | 711/154 |
| 2024/0039808 A1* | 2/2024 | Singwi | G06F 9/45558 |

OTHER PUBLICATIONS

Cody, Tyler, "A Layered Reference Model for Penetration Testing with Reinforcement Learning and Attack Graphs," 2022 IEEE 29th Annual Software Technology Conference (STC) Year: 2022 | Conference Paper | Publisher: IEEE.*

* cited by examiner

CYBERSECURITY VULNERABILITY VALIDATION TECHNIQUES UTILIZING RUNTIME DATA, STATIC ANALYSIS AND DYNAMIC INSPECTION

TECHNICAL FIELD

The present disclosure relates generally to detection of cybersecurity threats, and specifically to complementary solutions for cybersecurity threat detection utilizing static analysis and runtime data.

BACKGROUND

Cybersecurity threats come in many shapes and forms, such as malware, worms, cryptominers, man-in-the-middle attacks, code injection, misconfigurations, and so on. Different threats pose different risks, and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is, therefore, extremely useful to detect such cybersecurity threats.

For example, agent based solutions are able to detect both runtime and stored data, allowing to form a complete picture of the cybersecurity status of a machine having the agent installed thereon. However, agent-based solutions require heavy use of compute resources, such as processor and memory resources. This is due to the agent being deployed on the machine which is scanned. For endpoints in a network, this type of solution is impractical, as the use of those resources is reserved for performing the task of the endpoint machine. Furthermore, some agent solutions also require communication with a backend which provides definitions, rules, and the like, in order to enable the agent to scan for cybersecurity threats using up to date information. Additionally, some agent based solutions require root privileges, or are deployed as a privileged software container. This in itself is a security risk, as conveying such permissions is inherently risky. Therefore, as an endpoint detection and response (EDR) solution for a cloud computing production environment, agent based solutions fail at their objective, and indeed such solutions are rarely used on network endpoints due to the above mentioned reasons.

Agentless solutions, on the other hand, do not require an agent installed on a machine. These solutions include static analysis, for example of a disk of a machine, to determine what cybersecurity threats are present. However, such solutions likewise fail at providing a complete picture, since static analysis solutions do not have access to runtime data. Such agentless solutions also fail to provide real time threat detection, thereby potentially leaving cybersecurity threats with a response for prolonged periods of time.

Utilizing both types of solution is not practical, as there is overlap in the data of agent and agentless solutions, and the computational costs of deploying both solutions on a single network are great. This leads, in practice, to a choice between either type of solution, with the resignation that some threats will inevitably go undetected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a workload deployed in a computing environment for a cybersecurity issue. Method may also include deploying a sensor on the workload, the sensor configured to collect runtime data from the workload. Method may furthermore include initiating a first mitigation action with a first priority in the computing environment in response to validating the cybersecurity issue from the collected runtime data. Method may in addition include initiating a second mitigation action with a second priority, which is lower than the first priority, in response to failing to validate the cybersecurity issue from the collected runtime data. Other embodiments of this aspect include corresponding computer systems, apparatus, and computer programs recorded on one or more computer storage devices, each configured to perform the actions of the methods.

Implementations may include one or more of the following features. Method may include: generating an inspectable disk based on a disk of the workload; and inspecting the inspectable disk for a cybersecurity object, where the cybersecurity object indicates the cybersecurity issue. Method may include: determining reachability properties of the workload; generating an network path between an external network and the workload; and initiating active inspection of the network path to determine if the workload is a reachable workload. Method may include: initiating the first mitigation action with a third priority, higher than the first priority, in response to determining that the workload is a reachable workload. Method may include: configuring the sensor to collect: an artifact, an event, a datalink layer communication, a permission, a list of applications loaded in memory, a list of libraries loaded in memory, and a combination thereof. Method may include: initiating the first mitigation action including any one of: generating an alert, revoking a permission, revoking access to a workload, revoking access from a workload, sandboxing a workload, generating an alert, installing a software patch, uninstalling a software application, updating a priority of an alert, and any combination thereof. Implementations of the described techniques may include hardware, a method or process, or a computer tangible medium.

In one general aspect, non-transitory computer-readable medium may include one or more instructions that, when executed by one or more processors of a device, cause the device to: inspect a workload deployed in a computing environment for a cybersecurity issue. Medium may furthermore deploy a sensor on the workload, the sensor configured to collect runtime data from the workload. Medium may in addition initiate a first mitigation action with a first priority in the computing environment in response to validating the cybersecurity issue from the collected runtime data. Medium may moreover initiate a second mitigation action with a second priority, which is lower than the first priority, in response to failing to validate the cybersecurity issue from the collected runtime data. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a workload deployed in a computing environment for a cybersecurity issue. System may in addition deploy a sensor on the workload, the sensor configured to collect runtime data from the workload. System may moreover initiate a first mitigation action with a first priority in the computing environment in response to validating the cybersecurity issue from the collected runtime data. System may also initiate a second mitigation action with a second priority, which is lower than the first priority, in response to failing to validate the cybersecurity issue from the collected runtime data. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate an inspectable disk based on a disk of the workload; and inspect the inspectable disk for a cybersecurity object, where the cybersecurity object indicates the cybersecurity issue. System where the memory contains further instructions which when executed by the processing circuitry further configure the system to: determine reachability properties of the workload; generate a network path between an external network and the workload; and initiate active inspection of the network path to determine if the workload is a reachable workload. System where the memory contains further instructions which when executed by the processing circuitry further configure the system to: initiate the first mitigation action with a third priority, higher than the first priority, in response to determining that the workload is a reachable workload. System where the memory contains further instructions which when executed by the processing circuitry further configure the system to: configure the sensor to collect: an artifact, an event, a datalink layer communication, a permission, a list of applications loaded in memory, a list of libraries loaded in memory, and a combination thereof. System where the memory contains further instructions which when executed by the processing circuitry further configure the system to: initiate the first mitigation action including any one of: generate an alert, revoking a permission, revoking access to a workload, revoking access from a workload, sandboxing a workload, generating an alert, installing a software patch, uninstalling a software application, updating a priority of an alert, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
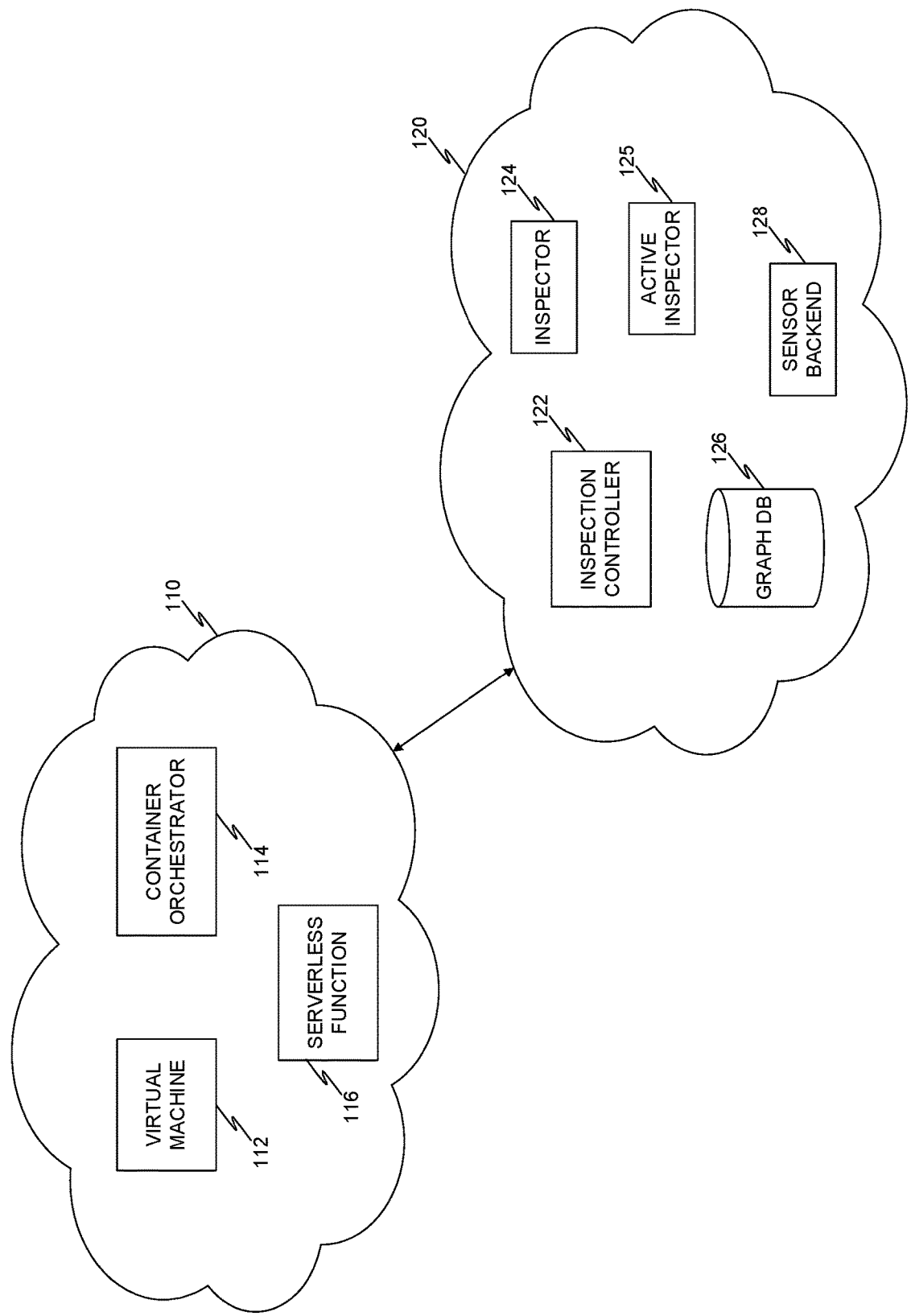
FIG. 1 is an example schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a sensor deployed on a workload in a cloud computing environment, to complement detection of cybersecurity threats using static analysis techniques. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example in response to determining that the event matches a predefined definition.

In certain embodiments the sensor is configured to send an event, for example based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a cryptominer malware.

By performing runtime and static analysis in this manner, the overlap in detection between the sensor and inspector are reduced. Additionally, the sensor is able to initiate inspection by the inspector, which allows efficient prioritizing of inspection resources, thereby reducing time to detection of cybersecurity threats, which also reduces time to respond to cybersecurity threats.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example correspond to an IP address range used by a malware, such as a cryptominer. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates a an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In some embodiments, the inspection environment 120 further includes an active inspector 125. In an embodiment, the active inspector is configured to detect reachability properties of a workload deployed in the cloud computing environment 110, and determine if a network path is a viable network path by performing active inspection. According to some embodiments, active inspection is initiated in response to validating a vulnerability, a misconfiguration, an exposure, and the like, via a sensor.

In certain embodiments, the inspection environment 120 further includes a security database 126, which includes a representation of the computing environment 110. In some embodiments, the security database 126 stores a security graph, for example as a Node4j® graph database.

In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
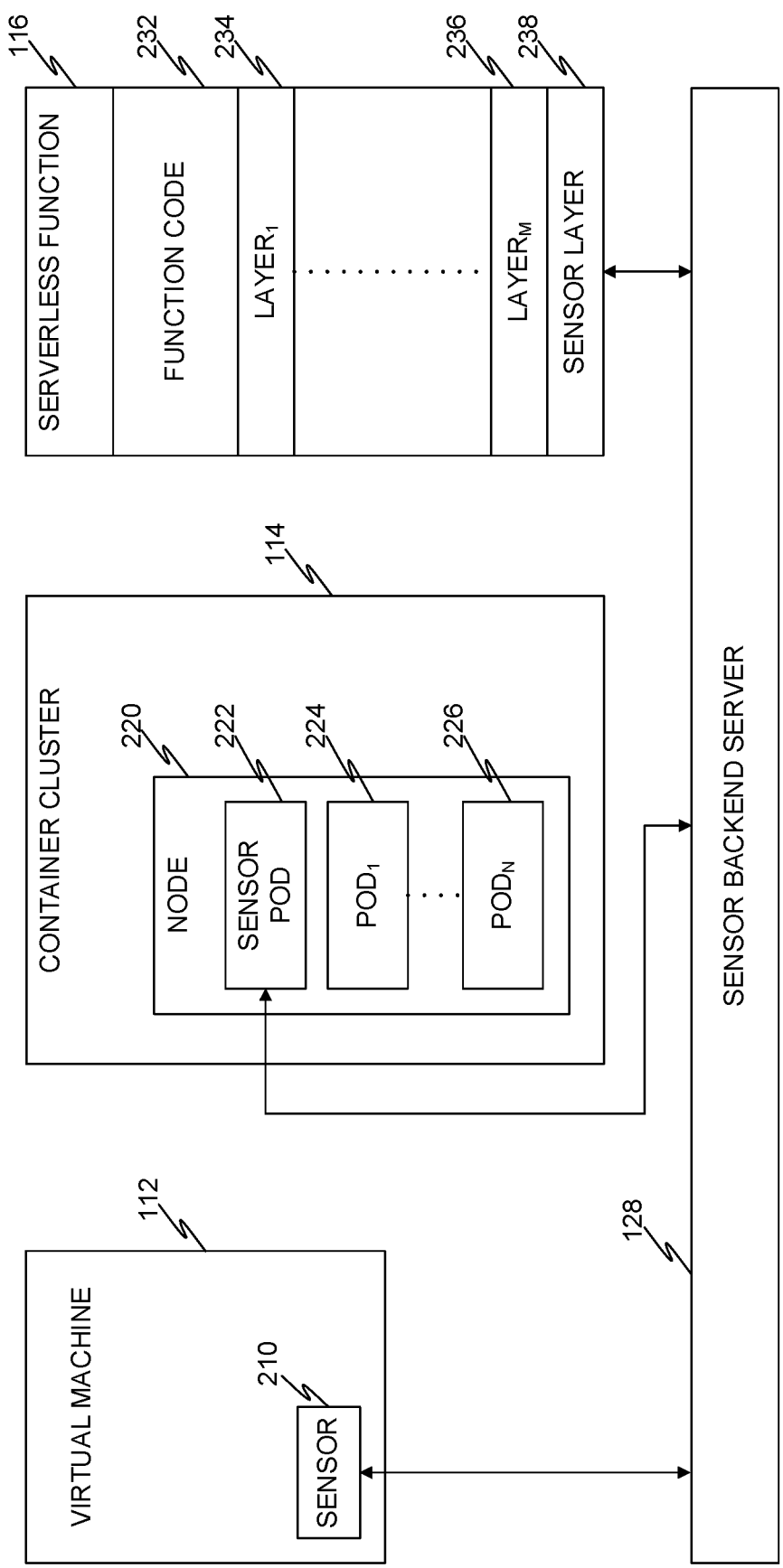
FIG. 2 is an example schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
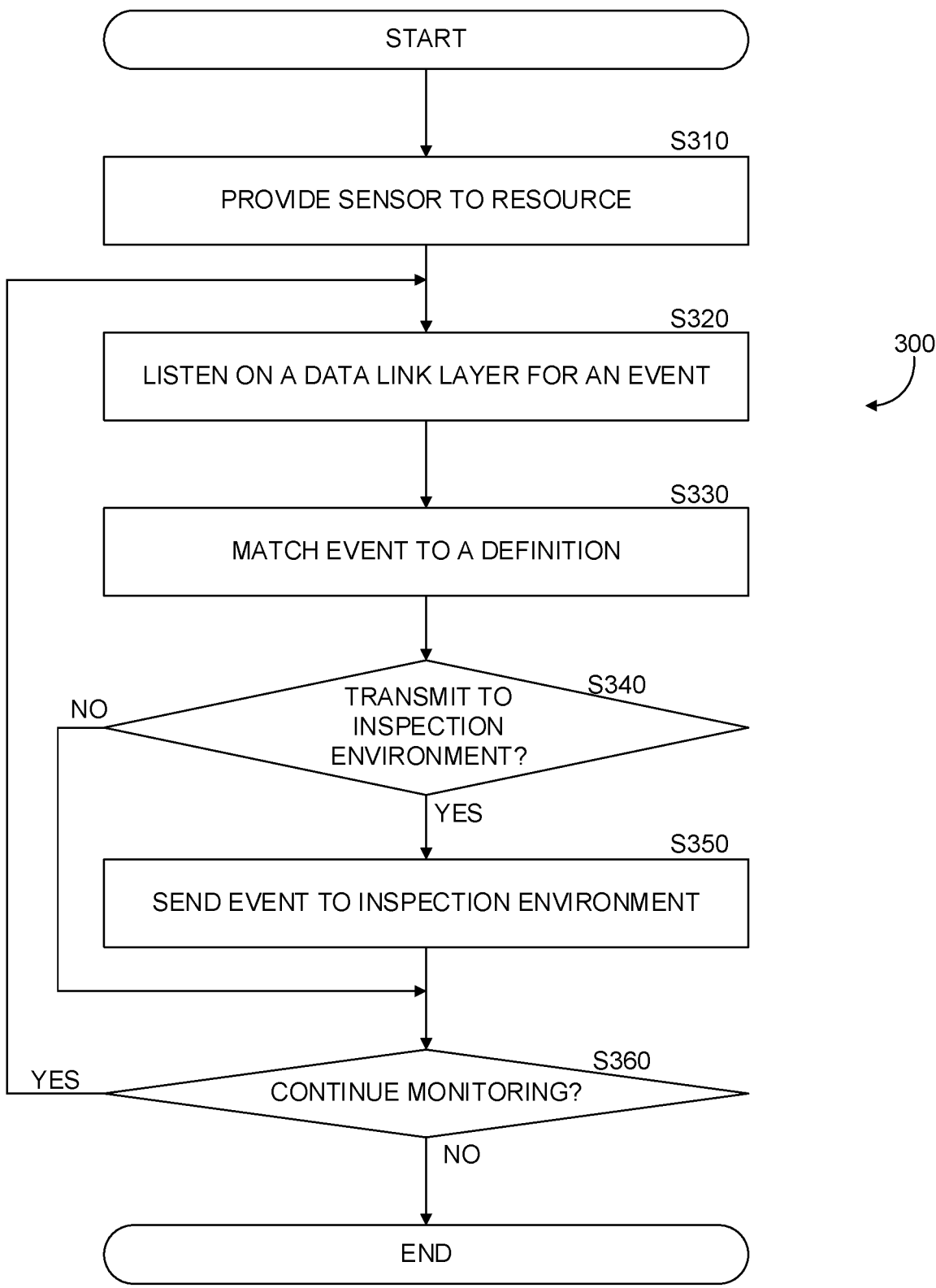
FIG. 3 is an example flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: " / usr / sbin/ rpc. mount d"
    last_seen: 1663138800
    exe_size: 133664
    exe_sha1: "200f06c12975399a4d7a32e171caabfb994f78b9"
    modules {
        path: " / usr / lib/ libresol v-2. 32. so"
        last_seen: 1663138800
```

```
    }
    modules {
        path: " / usr / lib/ libpthread-2. 32. so"
        last_seen: 1663138800
    }
    modules {
        path: " / usr / lib/ l d- 2. 32. so"
        last_seen: 1663138800
    }
    modules {
        path: " / usr / lib/ libc- 2. 32. so"
        last_seen: 1663138800
    }
    modules {
        path: " / usr / lib/ libtirpc. so. 3. 0. 0"
        last_seen: 1663138800
    }
    modules {
        path: " / usr / lib/ libnss_files- 2. 32. so"
        last_seen: 1663138800
    }
    modules {
        path: " / usr / sbin/ rpc. mount d"
        last_seen: 1663138800
    }
    listening_sockets {
        ip_addr : " 0. 0. 0. 0"
        port : 60311
    }
    listening_sockets {
        ip_addr : " 0. 0. 0. 0"
        port : 43639
    }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
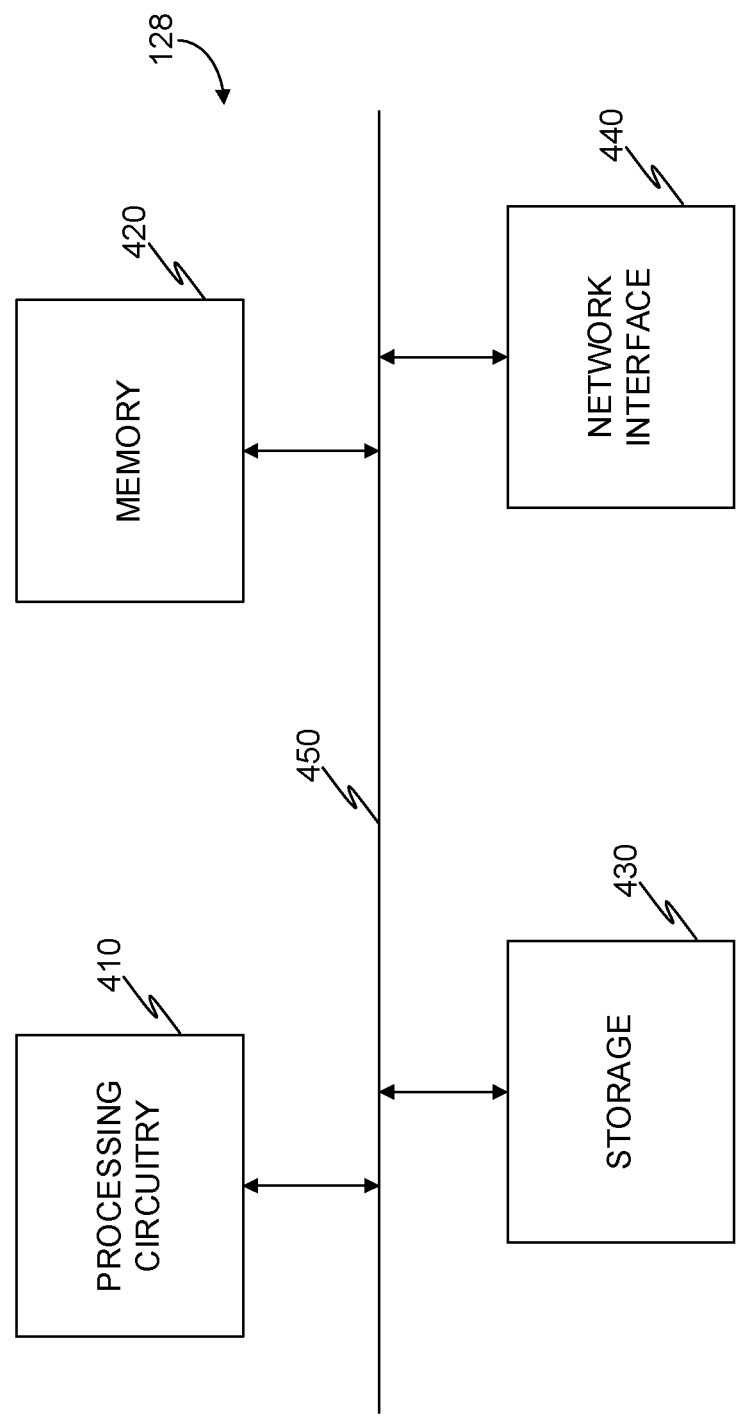
FIG. 4 is an example schematic diagram of a sensor backend server according to an embodiment.

FIG. 4 is an example schematic diagram of a sensor backend server 128 according to an embodiment. The sensor backend server 128 includes a processing circuitry 410 coupled to a memory 420, a storage 430, and a network interface 440. In an embodiment, the components of the sensor backend server 128 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the sensor backend server 128 to communicate with, for example, a sensor 210, a daemonset pod 222, a sensor layer 238, and the like.

It should be understood that the embodiments described herein are not limited to the specific architecture illustrated in FIG. 4, and other architectures may be equally used without departing from the scope of the disclosed embodiments.

Furthermore, in certain embodiments the inspection controller 122, inspector 124, and the like, may be implemented with the architecture illustrated in FIG. 4. In other embodiments, other architectures may be equally used without departing from the scope of the disclosed embodiments.

Figure 5:
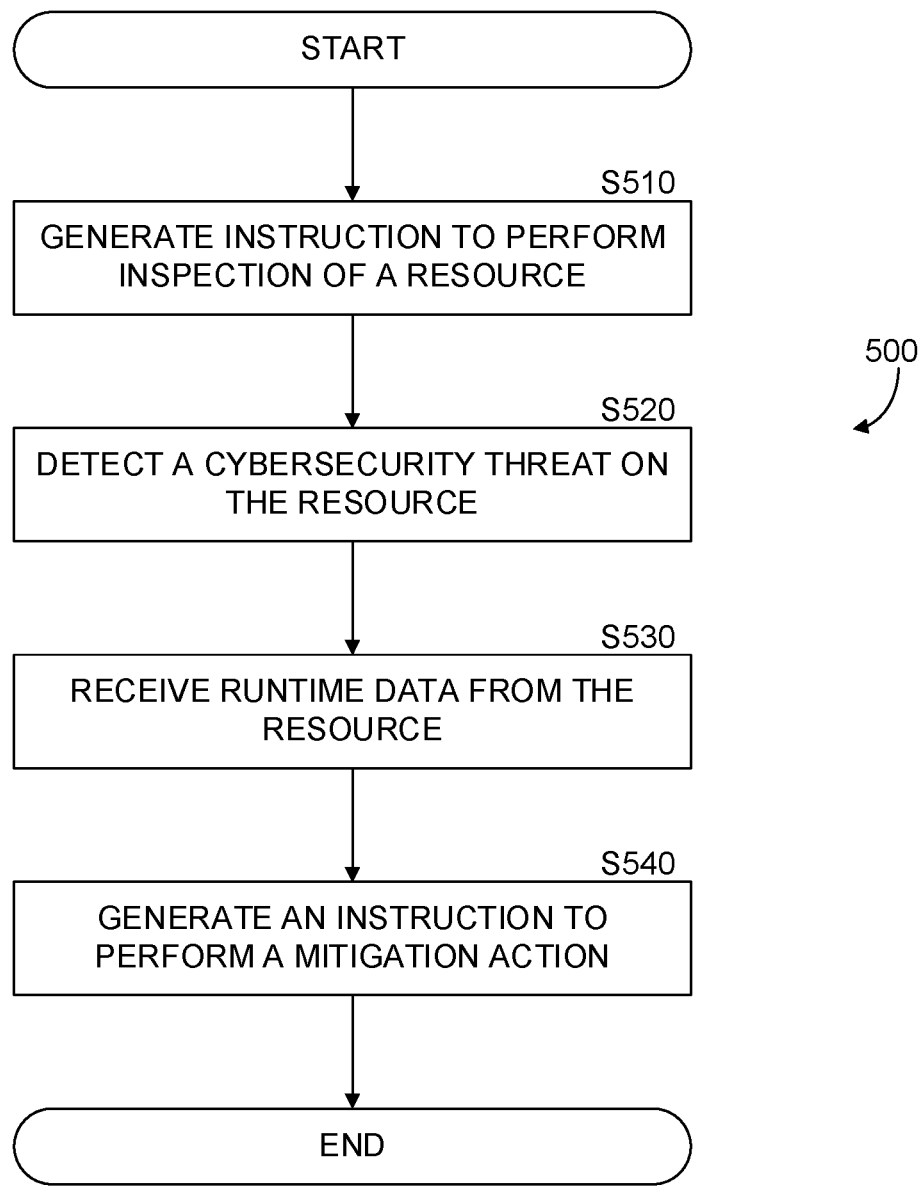
FIG. 5 is an example flowchart of a method for mitigating a cybersecurity threat, implemented in accordance with an embodiment.

FIG. 5 is an example flowchart 500 of a method for mitigating a cybersecurity threat, implemented in accordance with an embodiment.

At S510, an instruction to perform inspection is generated. In an embodiment, inspection is performed on a resource, which may be, for example, a virtual machine, a software container, a serverless function, and the like. In an embodiment, the instruction, when executed, generates an inspectable disk based on a disk of a resource. For example, in an embodiment an inspectable disk is generated by performing a snapshot, a clone, a copy, a duplicate, and the like, of a disk attached to a virtual machine. The inspectable disk is accessible by an inspector. In an embodiment, the inspector utilizes static analysis techniques, for example to detect cybersecurity objects, such as a password, a certificate, an application binary, a software library, a hash, and the like.

The detected cybersecurity objects, cybersecurity threats, and the like, are represented, in an embodiment, in a security graph. For example, a node is generated in an embodiment to represent a malware object. The node representing the malware object is connected to a node representing the resource on which an inspector detected the malware object, to indicate that the malware object is present on the resource.

At S520, a cybersecurity threat is detected. In an embodiment, a cybersecurity threat is detected in response to detecting a cybersecurity object on a disk. In certain embodiments, a cybersecurity threat is an exposure, a vulnerability, a misconfiguration, a malware code object, a hash, a combination thereof, and the like. In some embodiments, a hash, which is detected or generated, is compared to another hash of a list of hashes which indicate know cybersecurity threats. For example, malware code objects are often detected by generating hashes of code objects and comparing them to hashes stored in a database of known hashes which are associated with malicious software. In certain embodiments, the cybersecurity threat is a potential cybersecurity threat. In an embodiment, runtime data is utilized to determine if the potential cybersecurity threat is an actual cybersecurity threat.

At S530, runtime data is received. In an embodiment, the runtime data is received from the inspected resource. In certain embodiments, runtime data is received based on cybersecurity objects detected by static analysis methods performed on the resource. For example, an inspector accessing an inspectable disk which is generated based on a disk of a virtual machine deployed in a cloud computing environment detects application libraries, which are cybersecurity objects. In an embodiment a definition is generated based on the detected cybersecurity objects. For example, a cybersecurity object may be a binary of application "xyz". A definition is generated based on the detected cybersecurity object, for example "Application xyz is deployed in runtime". In an embodiment, a rule is generated, for example based on the definition, further stating "IF application xyz is deployed in runtime, THEN perform mitigation action".

At S540, an instruction to perform a mitigation action is generated. In an embodiment, the instruction, when executed, initiates a mitigation action in the cloud computing environment in which the resource is deployed. In some embodiments, the mitigation action is generated based on the detected cybersecurity threat and the received runtime data. In certain embodiments, the mitigation action includes generating an alert, assigning a severity score to an alert (e.g., low, moderate, severe, critical), modifying a severity score of an alert, and the like.

While static analysis techniques can detect such cybersecurity objects and threats, runtime data is required to determine if the cybersecurity objects and threats are actually present in runtime. For example, a database having a misconfiguration, such as no password protection, is considered a cybersecurity threat. Typically, an alert is generated in response to detecting such a cybersecurity threat, and a mitigation action is initiated. However, in cloud computing production environments many such alerts are generated, and therefore it is desirable to prioritize alerts based, for example, on a severity of an event. In this example, if a process for managing the database is not present at runtime, then the severity of the cybersecurity threat is actually lower than if the database software was running, and therefore presented an actual cybersecurity threat. It is therefore beneficial to combine static analysis data with runtime data in an efficient manner in order to prioritize responses, such as mitigation actions, to detected cybersecurity threats. This allows to better utilize the compute resources of a cloud computing environment, and improving response time to cybersecurity threats based on actual severity.

Figure 6:
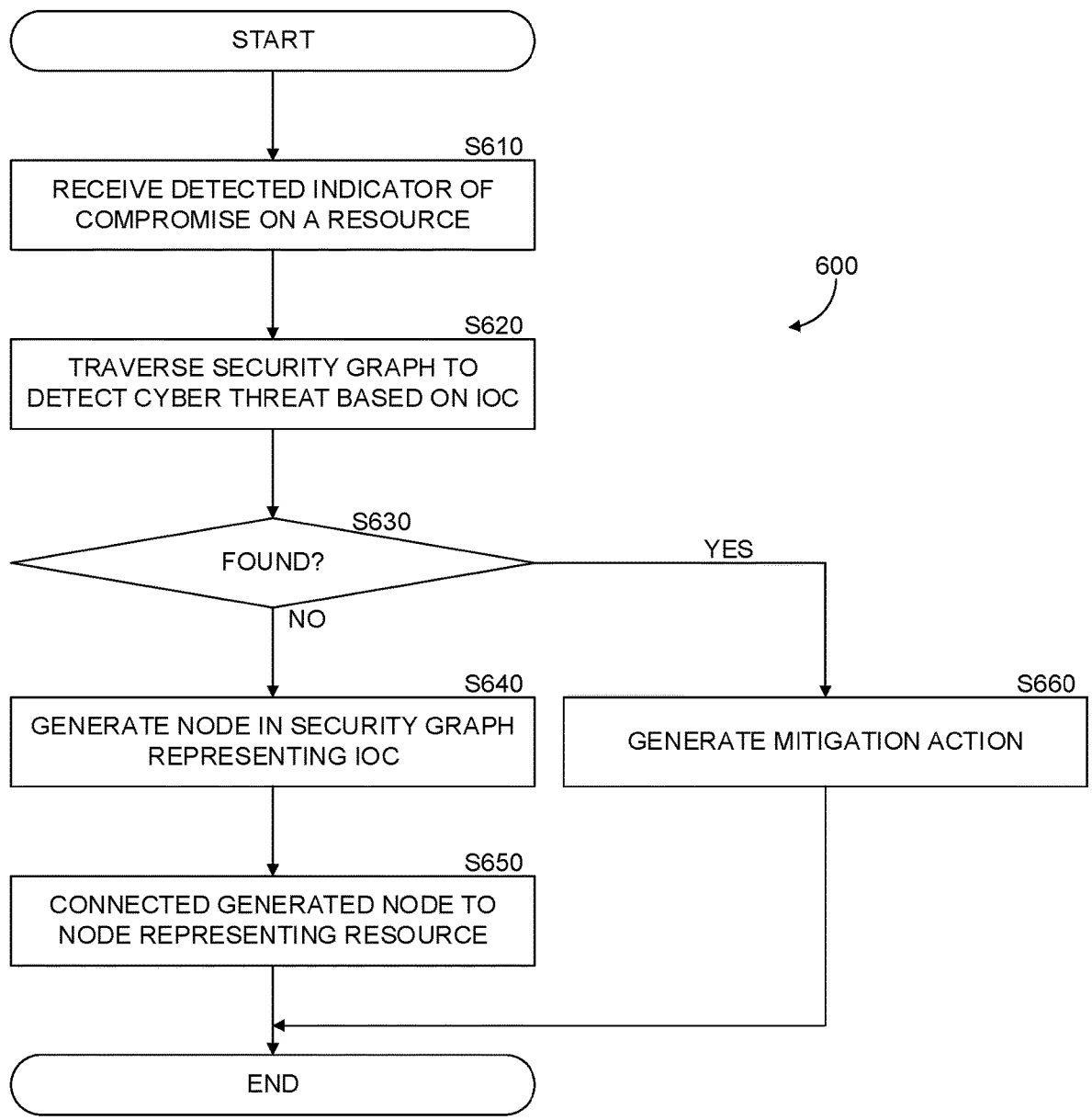
FIG. 6 is an example flowchart of a method for utilizing a security graph in detecting a cybersecurity threat based on an indicator of compromise, implemented in accordance with an embodiment.

FIG. 6 is an example flowchart 600 of a method for utilizing a security graph in detecting a cybersecurity threat based on an indicator of compromise, implemented in accordance with an embodiment.

At S610, an indicator of compromise (IOC) is received. In an embodiment, the IOC is received from a sensor, the sensor configured to detect an IOC. In certain embodiments, an IOC is data, such as network traffic data, login data, access data, a data request, and the like. For example, IOC data indicates, in an embodiment, unusual network traffic, unusual login time, unusual logged-in user session time, a high volume of requests for data, network traffic to restricted domains, network traffic to suspicious geographical domains, mismatched port-application network traffic (i.e. sending command and control communication as a DNS request over port 80), and the like.

In certain embodiments, an IOC data is generated based on an aggregation of events detected on a resource, for example on a virtual machine. In an embodiment, a sensor is configured to store a plurality of events, and generate aggregated data based on the stored plurality of events. For example, network traffic destinations are stored, in an embodiment, to perform anomaly detection, i.e., to detect network traffic destinations which are anomalous.

At S620, a security graph is traversed to detect a cybersecurity threat. In an embodiment, an instruction is generated which, when executed by a graph database, configures a database management system to execute a query for detecting a node in a security graph stored on the graph database. In certain embodiments, the detected node represents a resource on which a sensor is deployed, the sensor generating the IOC data which is received at S610.

In certain embodiments, a security graph is traversed to detect a node representing a cybersecurity threat corresponding to the IOC and connected to a node representing the resource from which the IOC was generated. For example, a query is generated based on the IOC data and executed on the security graph. In an embodiment, execution of the query returns a result.

At S630, a check is performed to determine if the cybersecurity threat was found. In an embodiment, the check includes receiving a result from a query executed on a security graph, and determining if a node representing a resource is connected to a node representing a cybersecurity threat. If 'yes', execution continues at S660. If 'no' execution continues at S640.

At S640, a node is generated to represent the IOC in the security graph. In an embodiment, IOC data is stored with the node. In certain embodiments, an identifier of an IOC may be assigned to the IOC data, and the identifier of the IOC is stored with the node in the graph database.

At S650, an edge is generated to connect the node representing the IOC to a node representing the resource. In an embodiment the resource is a resource from which the IOC originated. For example, an edge may be generated to connected the node representing the IOC to the node representing the resource.

At S660, a mitigation action is generated. In an embodiment, generating a mitigation action includes generating an instruction which when executed configures a computing device to initiate the mitigation action. In an embodiment, the mitigation is initiating an inspection of the resource, generating alert an alert, a combination thereof, and the like. In certain embodiments the alert is generated based on any one of: the IOC data, an identifier of the resource, a predetermined rule, a combination thereof, and the like. In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the IOC data.

Figure 7:
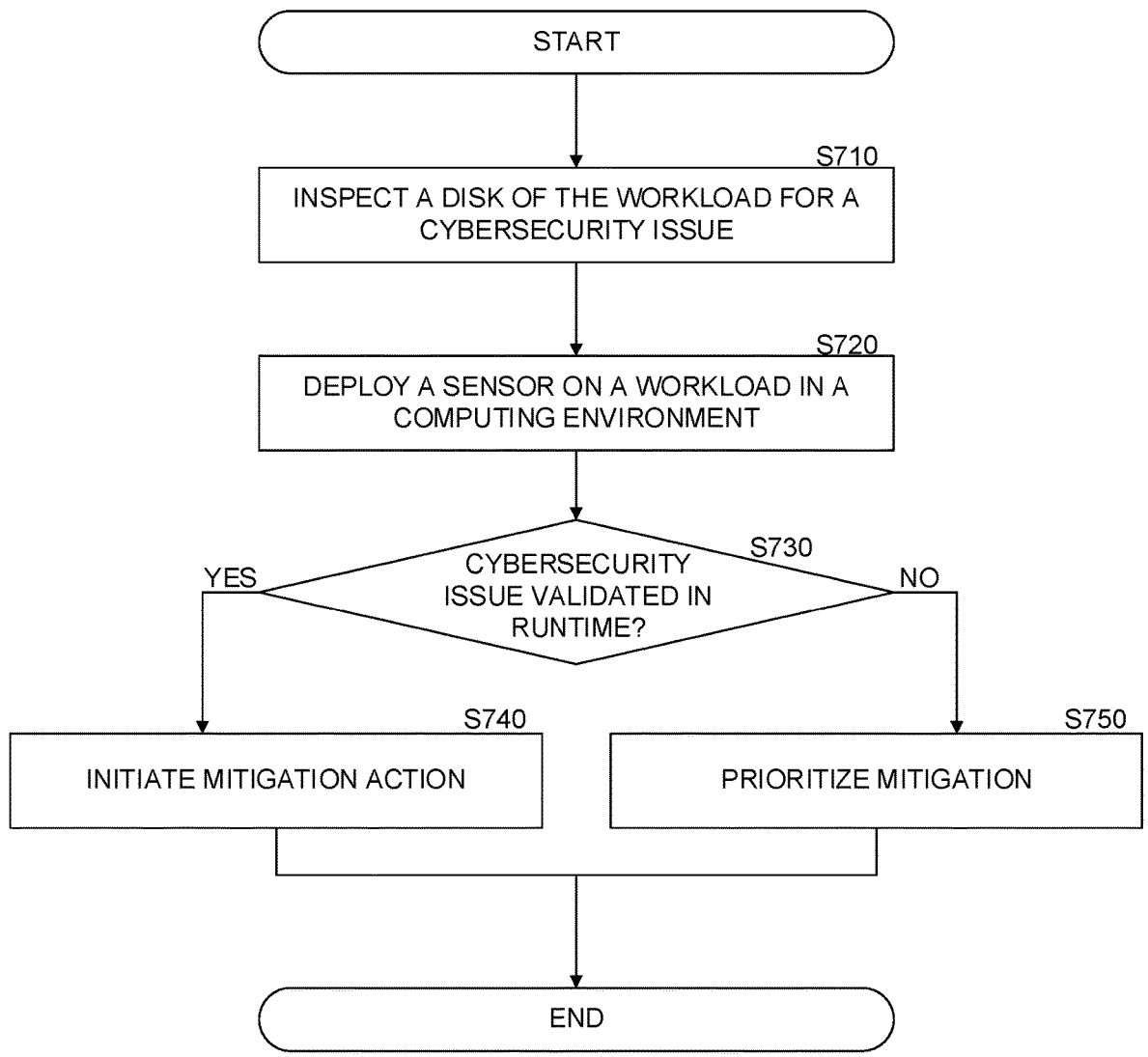
FIG. 7 is an example flowchart of a method for performing vulnerability validation through multiple data sources, implemented in accordance with an embodiment.

FIG. 7 is an example flowchart of a method for performing vulnerability validation through multiple data sources, implemented in accordance with an embodiment. Though vulnerability validation is discussed in this example embodiment, it should be evident that other cybersecurity issues, such as exposures, misconfigurations, and the like, are validated by utilizing a plurality of data sources.

At S710, a disk is inspected for a cybersecurity issue. In an embodiment, inspecting a disk for cybersecurity issue includes detecting a cybersecurity object on the disk. In some embodiments, a cybersecurity object is a cryptographic key, a certificate, an application, a binary, a library, a hash, a code object, a nested workload, a malware object, a misconfiguration, a vulnerability, a permission, an effective permission, a combination thereof and the like.

In certain embodiments, inspecting a disk for a cybersecurity object includes generating an inspectable disk based on an original disk. For example, an original disk is a disk which is allocated to a virtual machine, a software container, serverless function, and the like.

In some embodiments, generating an inspectable disk includes generating a copy, a clone, a snapshot, and the like, and basing the inspectable disk on the generated copy, clone, snapshot, and the like.

In an embodiment, an inspector configured to inspect for the cybersecurity object is provided access to the inspectable disk, for example by providing access to the inspectable disk by assuming a service account.

In certain embodiments, the inspector is provisioned on-demand, for example by an inspection controller, in response to demand for inspector workloads. In an embodiment, in response to detecting competition of cybersecurity inspection, the inspector workload is de-provisioned.

At S720, a sensor is deployed on a workload. In an embodiment, the sensor is deployed on a workload which is associated with the disk. In some embodiments, the sensor is deployed utilizing the methods described in more detail above.

In certain embodiments, the sensor is configured, for example by a sensor backend server, to detect events, permissions, runtime artifacts, objects, running code, running applications, loaded applications, combinations thereof, and the like.

In an embodiment, the sensor is configured to detect events, artifacts, and the like, based on detection of a cybersecurity object during inspection. For example, according to an embodiment, a sensor backend server is configured to configure a sensor to detect a particular artifact, event, and the like, based on detecting, for example, a misconfiguration on an inspectable disk associated with the workload on which the sensor is deployed.

At S730, a check is performed to determine if the cybersecurity issue is validated. In an embodiment, validating a cybersecurity issue includes receiving a result of an inspection (e.g., static analysis), receiving a signal from a sensor (e.g., detecting an event, artifact, etc.), receiving a result from active inspection, and a combination thereof. Active inspection is discussed in more detail with respect to FIG. 8 below.

In some embodiments, where the cybersecurity issue is validated, execution continues at S740. In certain embodiments, where the cybersecurity issue is not validated, execution continues at S750. In an embodiment, where the cybersecurity issue is invalidated, execution continues at S750.

At S740, a mitigation action is initiated. In some embodiments, initiating a mitigation action includes storing an indicator in a security database to indicate that a cybersecurity issue is validated. In some embodiments, the mitigation action includes storing an indicator in a security database to indicate that the cybersecurity issue is validated through run-time data, through active inspection, through inspection, a combination thereof, and the like.

In certain embodiments, the mitigation action includes initiating a remediation action. For example, in an embodiment, a software package is detected through static analysis. In some embodiments, the software includes a vulnerability, which is exploitable for example via a network path. In an embodiment, an active inspector is configured to inspect a network path to determine if the software package vulnerability is exploitable.

In some embodiments, a sensor is configured to determine if the software package is deployed in run-time. For example, in an embodiment, a software package is deployed in run-time, where the software package is loaded into a memory (e.g., a virtual memory) of a workload.

In certain embodiments, active inspection is only initiated in response to validating the vulnerability in run-time. This is advantageous as active inspection requires allocation of compute resources, and it is wasteful to allocate such resources if the software package is not actually running when the workload is deployed. It is possible, according to an embodiment, for a software package to be installed on a workload, and not run during deployment.

In some embodiments, the mitigation action includes a priority. For example, in embodiment, cybersecurity issues which are validated in run-time are stored with a higher priority value (e.g., a qualitive priority value, a quantitative priority value, a combination thereof, and the like) than cybersecurity issues which are not validated at run-time.

According to an embodiment, a mitigation action includes generating an alert, revoking a permission, revoking access to a workload, revoking access from a workload, sandboxing a workload, generating an alert, installing a software patch, uninstalling a software application, updating a priority of an alert, a combination thereof, and the like.

At S750, a mitigation action is prioritized. In an embodiment, where a cybersecurity issue is invalidated, or is found to be not a validated cybersecurity issue, the cybersecurity issue still exists on the workload. For example, an inspection of a workload exposes that the workload includes 100 software packages, of which 20 are deployed in run-time. Of the remaining 80 software packages which are not deployed, 2 have a vulnerability, while of the 20 deployed, 5 include vulnerabilities.

It is more efficient, according to an embodiment, to prioritize initiating mitigation actions for the 5 software packages which are deployed and detected in runtime, than it is for the 2 software packages which are not deployed in runtime. This is because in order to exploit a vulnerability in an application, the application typically has to be executed. Therefore, according to an embodiment, mitigation actions for cybersecurity issues which are not validated in runtime are prioritized lower than mitigation actions for cybersecurity issues which are validated in runtime.

Figure 8:
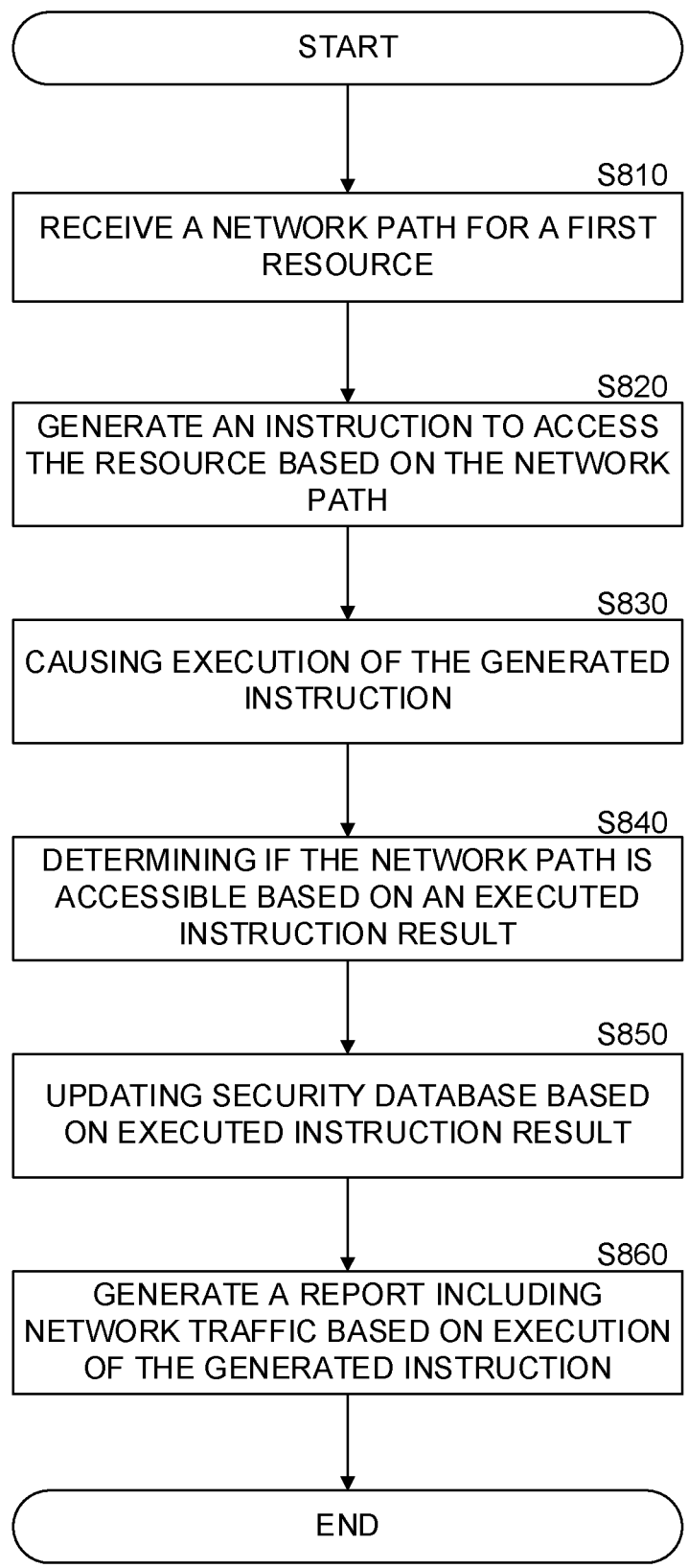
FIG. 8 is an example flowchart of a method for performing active inspection of a cloud computing environment, implemented in accordance with an embodiment.

FIG. 8 is an example flowchart of a method for performing active inspection of a cloud computing environment, implemented in accordance with an embodiment.

At S810, a network path for a first resource in a cloud computing environment is received. The network path, also known as object reachability, includes data (e.g., reachability parameters) for accessing the first resource from a public network, which is not the cloud computing environment of the first resource, such as the Internet. In an embodiment, an active inspector may receive the at least a network path, for example from a security graph. In an embodiment, S820 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is discussed in more detail in U.S. patent application Ser. No. 17/659,164 titled "Techniques for Active Inspection of Vulnerability Exploitation Using Exposure Analysis", the entire contents of which are incorporated by reference herein.

At S820, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET/bin HTTP/1.1
Host: 10.0.0.127:800 and further generate another HTTP GET request:

GET/bin HTTP/1.1
Host: 10.0.0.127:801 and so on, which when executed attempt to access a/bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S830, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S840, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S850, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S860, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 126 may be updated based on the determined viability of the network paths. For example, if a resource is successfully accessed, or successfully unaccessed (i.e., an attempt was made to access the resource and the attempt was not successful in accessing the resource), this result can be stored as an attribute of a node representing the resource in the security graph. For example, according to an embodiment, a node representing a workload includes an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

Furthermore, utilizing the active inspector to validate network paths and updating a security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

In an embodiment, utilizing an active inspector allows to further validate a cybersecurity issue which is validated at runtime. In some embodiments, a cybersecurity issue which is validated at runtime and further exploitable through active inspection is a considerably higher risk than other cybersecurity issues. It is therefore advisable to mitigate such cybersecurity issues prior to mitigating others, where there is a need to prioritize and allocate mitigation resources.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for validating cybersecurity issues utilizing runtime data, comprising:
   inspecting a workload deployed in a computing environment for a cybersecurity issue using at least a static analysis technique;
   deploying a sensor on the workload, the sensor configured to collect runtime data from the workload;
   determining reachability properties of the workload;
   generating a network path between an external network and the workload;
   initiating active inspection of the network path to determine if the workload is a reachable workload;
   initiating a first mitigation action with a first priority in the computing environment in response to validating the cybersecurity issue from the collected runtime data; and
   initiating a second mitigation action with a second priority, which is lower than the first priority, in response to failing to validate the cybersecurity issue from the collected runtime data and determining that the workload is not a reachable workload.

2. The method of claim 1, further comprising:
   generating an inspectable disk based on a disk of the workload; and
   inspecting the inspectable disk for a cybersecurity object, wherein the cybersecurity object indicates the cybersecurity issue.

3. The method of claim 1, further comprising:
   initiating the first mitigation action with a third priority, higher than the first priority, in response to determining that the workload is a reachable workload.

4. The method of claim 1, further comprising:
   configuring the sensor to collect: an artifact, an event, a datalink layer communication, a permission, a list of applications loaded in memory, a list of libraries loaded in memory, and a combination thereof.

5. The method of claim 1, further comprising:
   initiating the first mitigation action including any one of: generating an alert, revoking a permission, revoking access to a workload, revoking access from a workload, sandboxing a workload, generating an alert, installing a software patch, uninstalling a software application, updating a priority of an alert, and any combination thereof.

6. A non-transitory computer-readable medium storing a set of instructions for validating cybersecurity issues utilizing runtime data, the set of instructions comprising:
   one or more instructions that, when executed by one or more processors of a device, cause the device to:
   inspect a workload deployed in a computing environment for a cybersecurity issue using at least a static analysis technique;
   deploy a sensor on the workload, the sensor configured to collect runtime data from the workload;
   determine reachability properties of the workload;
   generate a network path between an external network and the workload;

initiate active inspection of the network path to determine if the workload is a reachable workload;

initiate a first mitigation action with a first priority in the computing environment in response to validating the cybersecurity issue from the collected runtime data; and initiate a second mitigation action with a second priority, which is lower than the first priority, in response to failing to validate the cybersecurity issue from the collected runtime data and determining that the workload is not a reachable workload.

7. A system for validating cybersecurity issues utilizing runtime data comprising:

a processing circuitry;

a memory, the memory containing instructions that, when executed by the processing circuitry, configure the system to:

inspect a workload deployed in a computing environment for a cybersecurity issue using at least a static analysis technique;

deploy a sensor on the workload, the sensor configured to collect runtime data from the workload;

determine reachability properties of the workload;

generate a network path between an external network and the workload;

initiate active inspection of the network path to determine if the workload is a reachable workload;

initiate a first mitigation action with a first priority in the computing environment in response to validating the cybersecurity issue from the collected runtime data; and initiate a second mitigation action with a second priority, which is lower than the first priority, in response to failing to validate the cybersecurity issue from the collected runtime data and determining that the workload is not a reachable workload.

8. The system of claim 7, wherein the memory contains further instructions which when executed by the processing circuitry further configure the system to:

generate an inspectable disk based on a disk of the workload; and inspect the inspectable disk for a cybersecurity object, wherein the cybersecurity object indicates the cybersecurity issue.

9. The system of claim 7, wherein the memory contains further instructions which when executed by the processing circuitry further configure the system to:

initiate the first mitigation action with a third priority, higher than the first priority, in response to determining that the workload is a reachable workload.

10. The system of claim 7, wherein the memory contains further instructions which when executed by the processing circuitry further configure the system to:

configure the sensor to collect:

an artifact, an event, a datalink layer communication, a permission, a list of applications loaded in memory, a list of libraries loaded in memory, and a combination thereof.

11. The system of claim 7, wherein the memory contains further instructions which when executed by the processing circuitry further configure the system to:

initiate the first mitigation action including any one of:

generate an alert, revoking a permission, revoking access to a workload, revoking access from a workload, sandboxing a workload, generating an alert, installing a software patch, uninstalling a software application, updating a priority of an alert, and any combination thereof.

* * * * *

UNITED STATES PATENT AND TRADEMARK OFFICE
CERTIFICATE OF CORRECTION

| | | |
|---|---|---|
| PATENT NO. | : 12,095,806 B1 | Page 1 of 1 |
| APPLICATION NO. | : 18/392906 | |
| DATED | : September 17, 2024 | |
| INVENTOR(S) | : Arik Nemtsov et al. | |

It is certified that error appears in the above-identified patent and that said Letters Patent is hereby corrected as shown below:

In the Specification

DETAILED DESCRIPTION:
Please amend Column 17, Line 23 with the following correction:
In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:
GET /bin HTTP/1.1
Host:10.0.0.127:800
and further generate another HTTP GET request:
GET /bin HTTP/1.1
Host:10.0.0.127:801
and so on, which when executed attempt to access a /bin folder in the resource which has an IP address of 10.0.0.127. In certain embodiments, the active inspector (e.g., the active inspector 125 of Fig. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

Signed and Sealed this
Eighth Day of April, 2025

Coke Morgan Stewart
*Acting Director of the United States Patent and Trademark Office*